United States Patent
Tomoike

(10) Patent No.: US 6,950,390 B2
(45) Date of Patent: Sep. 27, 2005

(54) MOBILE COMMUNICATION SYSTEM AND GATEWAY SELECTING METHOD THEREOF

(75) Inventor: Hiroyuki Tomoike, Tokyo (JP)

(73) Assignee: NEC Corporation, Tokyo (JP)

( * ) Notice: Subject to any disclaimer, the term of this patent is extended or adjusted under 35 U.S.C. 154(b) by 889 days.

(21) Appl. No.: 09/884,145

(22) Filed: Jun. 20, 2001

(65) Prior Publication Data

US 2001/0055285 A1 Dec. 27, 2001

(30) Foreign Application Priority Data

Jun. 21, 2000 (JP) .................................. P2000-186686

(51) Int. Cl.[7] .............................................. G01R 31/08
(52) U.S. Cl. ..................................... 370/219; 370/232
(58) Field of Search ................................ 370/229, 232, 370/230, 235, 352, 401, 219

(56) References Cited

U.S. PATENT DOCUMENTS

| | | | |
|---|---|---|---|
| 5,961,598 A | 10/1999 | Sime | |
| 6,148,201 A | * 11/2000 | Ernam et al. | 455/433 |
| 6,192,029 B1 | * 2/2001 | Averbuch et al. | 370/229 |
| 6,473,411 B1 | 10/2002 | Kumaki et al. | |
| 6,504,839 B2 | * 1/2003 | Valentine et al. | 370/354 |
| 6,697,355 B1 | * 2/2004 | Lim | 370/352 |
| 2002/0191562 A1 | 12/2002 | Kumaki et al. | |

FOREIGN PATENT DOCUMENTS

| | | |
|---|---|---|
| EP | 1 049 296 A1 | 11/2000 |
| JP | 63-268328 | 11/1988 |
| JP | 06-060000 A | 3/1994 |
| JP | 7-105111 | 4/1995 |
| JP | 09-222847 A | 8/1997 |
| JP | 10-126433 | 5/1998 |
| JP | 11-266276 A | 9/1999 |
| JP | 11-298526 | 10/1999 |
| JP | 11-306067 A | 11/1999 |
| JP | 2000-69050 | 3/2000 |
| JP | 2000-148710 A | 5/2000 |
| WO | WO 98/40831 | 9/1998 |
| WO | WO 00/41414 A1 | 7/2000 |
| WO | WO 01/27772 A1 | 4/2001 |
| WO | WO 01/35601 A1 | 5/2001 |

OTHER PUBLICATIONS

Yakura et al., "The Select Method of Plural network for PDC Packet Mobile Communication Network", *Proceedings of the 1998 IEICE Communication Society Conference*, B–5–87, p. 337, (1998).

* cited by examiner

*Primary Examiner*—Chau Nguyen
*Assistant Examiner*—Andrew Wahba
(74) *Attorney, Agent, or Firm*—Foley & Lardner LLP

(57) ABSTRACT

The load of each gateway for connecting the mobile network and a predetermined communication network is distributed. In each gateway, data stored in a predetermined information server connected to the communication network is obtained in response to a request from the mobile terminal; the format of the obtained data is converted according to restrictions on resources of the mobile terminal; load imposed on predetermined processes including the data obtainment and the format conversion is measured; and load data indicating information relating to the measured load is sent. In a mobile communication control apparatus for selecting one of the gateways, the load data communicated from each gateway is stored, and when receiving a request for obtaining the data stored in the information server from the mobile terminal, the apparatus selects a gateway based on the load data.

9 Claims, 4 Drawing Sheets

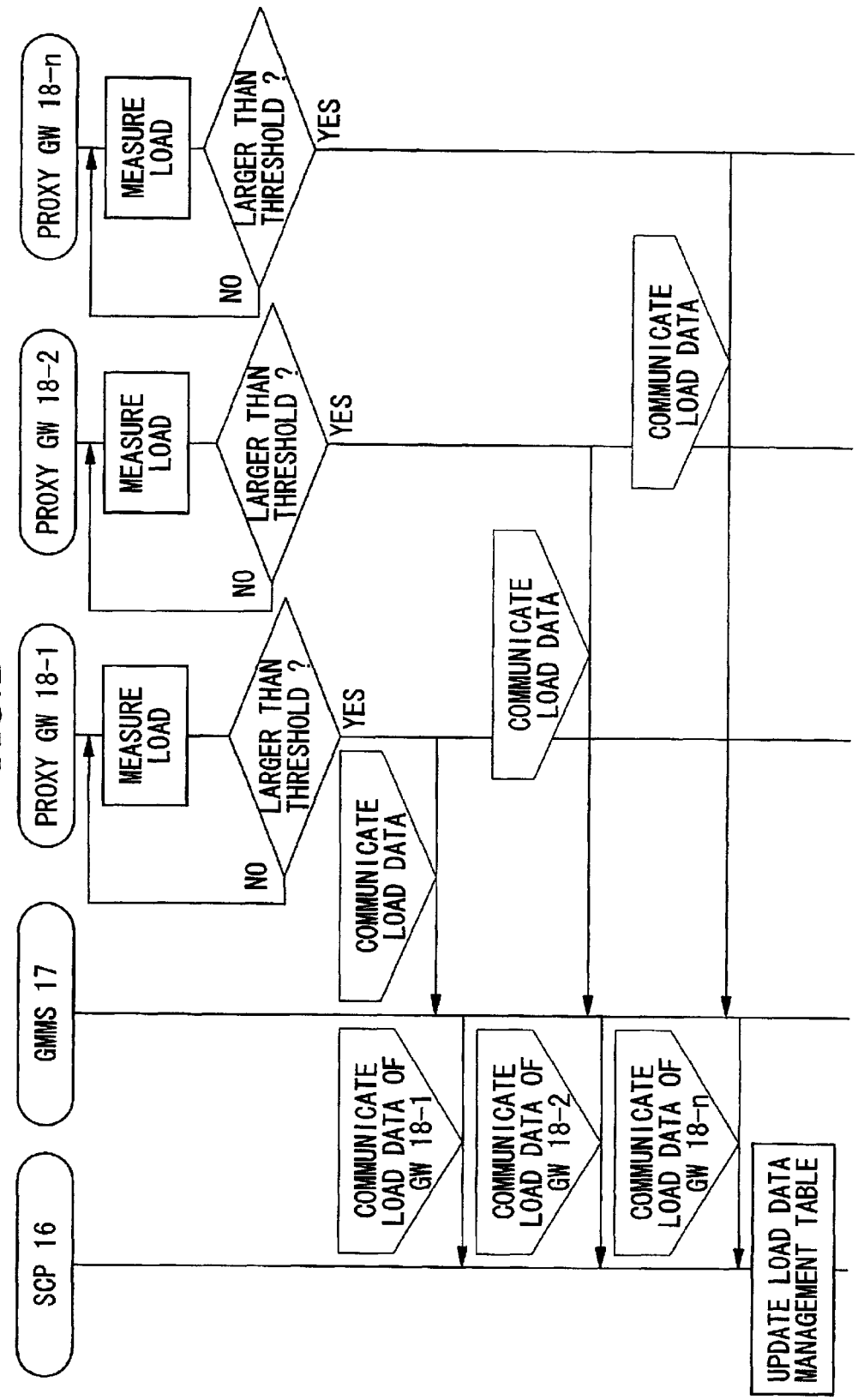

MOBILE COMMUNICATION SYSTEM AND GATEWAY SELECTING METHOD THEREOF

BACKGROUND OF THE INVENTION

1. Field of the Invention

The present invention relates to a mobile communication system and a gateway selecting method thereof, and in particular, those in which when a mobile terminal connects to a predetermined connection network, a format conversion suitable to the mobile terminal is performed in a gateway.

2. Description of the Related Art

Recently, accompanied with the progress of mobile computing systems, services for obtaining contents on the Internet by using a mobile terminal or device have been provided.

In such an Internet access service in a mobile communication environment, the transmission speed of the relevant wireless-access line and the limitation in the resources of the mobile terminal (such as the display size or the memory capacity) should be considered, and thus in a gateway for connecting the mobile network and the Internet, the format of the original contents may be converted into a format suitable for the relevant mobile environment.

However, in conventional mobile communication systems, when the traffic of the Internet access from mobile terminals suddenly increases, the load imposed on each gateway for converting the format extremely increases, thereby causing inconvenience.

Here, each gateway for connecting a mobile network to the Internet performs a format conversion of the original contents so as to obtain a format suitable for the relevant mobile environment. Therefore, if the traffic of the Internet access from mobile terminals suddenly increases, and the load is concentrated on a specific gateway, the conversion process cannot be executed in time, that is, operation delay may occur, or in the worst case, some jobs cannot be processed.

Accordingly, gateway selecting methods for preventing such a concentration of the load on a specific gateway have been proposed. The following is an article which discloses an example of it: K. Yakura et al., "the Select Method of Plural Network for PDC Packet Mobile Communication Network", Proceedings of the 1998 IEICE Communication Society Conference, B-5-87, p.337, 1998. In the disclosed method, the load is distributed by cyclically selecting one of several gateways (i.e., equal control). However, even in this method, the load may still be concentrated to a specific gateway because each subscriber has a different session opening time, and obtains a different amount of contents.

SUMMARY OF THE INVENTION

In consideration of the above circumstances, an objective of the present invention is to provide a mobile communication system and a gateway selecting method thereof, for distributing the load imposed on gateways.

Therefore, the present invention provides a mobile communication system for providing a service of connecting a mobile terminal to a predetermined communication network, comprising:

a plurality of gateways, each including:
  a data obtaining section for obtaining data stored in a predetermined information server connected to the communication network in response to a request from the mobile terminal;
  a format converting section for converting the format of the obtained data according to restrictions on resources of the mobile terminal;
  a load measuring section for measuring load imposed on predetermined processes including the data obtainment and the format conversion; and
  a load data communicating section for communicating load data indicating information relating to the measured load, and a mobile communication control apparatus including:
  a load data obtaining device for obtaining the load data communicated from each gateway;
  a load data storage device for storing the obtained load data; and
  a gateway selecting device for selecting one of the gateways, which is connected to the mobile terminal, based on the obtained load data when the mobile communication control apparatus receives a request for obtaining the data stored in the information server from the mobile terminal.

Accordingly, the mobile communication control apparatus obtains the load situation of each gateway, and when receiving a request for obtaining the data stored in the information server from the mobile terminal, the mobile communication control apparatus selects a suitable gateway (to be connected to the mobile terminal) based on the obtained load data, and informs the mobile terminal of the result of selection. Therefore, the load of the gateways can always be equally distributed.

Typically, the predetermined communication network is the Internet; and the data obtaining section of each gateway obtains contents in a Web site on the Internet.

There are several Web sites on the Internet, and a variety of data can be obtained by accessing the Internet, including product information, shop guides, sightseeing information, event information, timetables of transport facilities, theater programs, news, hobby information, and the like. According to the present invention, when a mobile terminal accesses a Web site on the Internet, the load of the gateways can be distributed, so that the mobile terminal can easily obtain necessary data with a short waiting time.

As a typical example, the load measuring section of each gateway measures the number of sessions of the gateway which are being engaged. Accordingly, the load necessary for a communication process executed by the gateway can be measured, thereby selecting a suitable gateway and distributing the load imposed on the communication using the gateways.

As another typical example, the load measuring section of each gateway measures an activity rate of a processor for controlling all relevant processes including the data obtainment and the format conversion. That is, the load imposed on the processor for controlling the whole gateway is measured, thereby selecting a suitable gateway and distributing the load necessary for the general operation of the gateways.

It is possible that:
  the load data communicating section of each gateway communicates the load data to the mobile communication control apparatus when the load measured by the load measuring section exceeds a predetermined threshold; and
  the gateway selecting device of the mobile communication control apparatus selects one of the gateways which has not communicated the load data.

In this case, the load data is communicated only when the load measured by each gateway exceeds a predetermined value. Therefore, the frequency of communicating the load data between the gateway and the mobile communication control apparatus is small. In addition, the mobile communication control apparatus can select any one of several gateways which have not communicated the load data, and thus the selecting operation is easy. Therefore, this method can be used for saving a gateway whose load is very heavy and which has possibility of operation delay.

It is also possible that:

the load data communicating section of each gateway communicates a load value measured by the load measuring section to the mobile communication control apparatus; and the gateway selecting device of the mobile communication control apparatus refers to the measured load value of each gateway and selects one of the gateways which has the smallest value.

In this case, the gateway sends each measured load value, that is, always sends the load data. Therefore, it is unnecessary to determine whether the load exceeds a predetermined value. In addition, the mobile communication control apparatus can detect the value of the load of each gateway, thereby performing fine control of load distribution. Therefore, even in the normal state in which the load is not concentrated on a specific gateway, the load of the gateways can be equally distributed.

The present invention also provides a gateway selecting method of selecting one of gateways in a mobile communication system for providing a service of connecting a mobile terminal to a predetermined communication network, the method comprising:

the steps performed by each of the gateways, including:

a data obtaining step for obtaining data stored in a predetermined information server connected to the communication network in response to a request from the mobile terminal;

a format converting step for converting the format of the obtained data according to restrictions on resources of the mobile terminal;

a load measuring step for measuring load imposed on predetermined processes including the data obtainment and the format conversion; and a load data communicating step for communicating load data indicating information relating to the measured load, and the steps performed by a mobile communication control apparatus for selecting one of the gateways, wherein a session is engaged between the selected gateway and the mobile terminal, said steps including:

a load data obtaining step for obtaining the load data communicated from each gateway;

a load data storage step for storing the obtained load data; and a gateway selecting step for selecting one of the gateways, which is connected to the mobile terminal, based on the obtained load data when a request for obtaining the data stored in the information server is sent from the mobile terminal to the mobile communication control apparatus.

According to this method, the load situation of each gateway can be obtained, and when a request for obtaining the data stored in the information server is issued from the mobile terminal, a suitable gateway (to be connected to the mobile terminal) can be selected based on the obtained load data. Therefore, the load of the gateways can always be equally distributed.

In the method, the load measuring step may include measuring the number of sessions of the gateway which are being engaged.

On the other hand, the load measuring step may include measuring an activity rate of a processor for controlling all relevant processes including the data obtainment and the format conversion.

It is possible that:

the load data communicating step includes communicating the load data to the mobile communication control apparatus when the load measured by the load measuring section exceeds a predetermined threshold; and the gateway selecting step includes selecting one of the gateways which has not communicated the load data.

It is also possible that:

the load data communicating step includes communicating a load value measured by the load measuring section to the mobile communication control apparatus; and the gateway selecting step includes referring to the measured load value of each gateway and selecting one of the gateways which has the smallest value.

BRIEF DESCRIPTION OF THE DRAWINGS

FIG. 2 is a timing chart of the load data communicating process performed in the mobile communication system, as an embodiment of the present invention.

DESCRIPTION OF THE PREFERRED EMBODIMENTS

Hereinafter, an embodiment of the mobile communication system according to the present invention will be explained in detail with reference to the drawings.

Figure 1A:
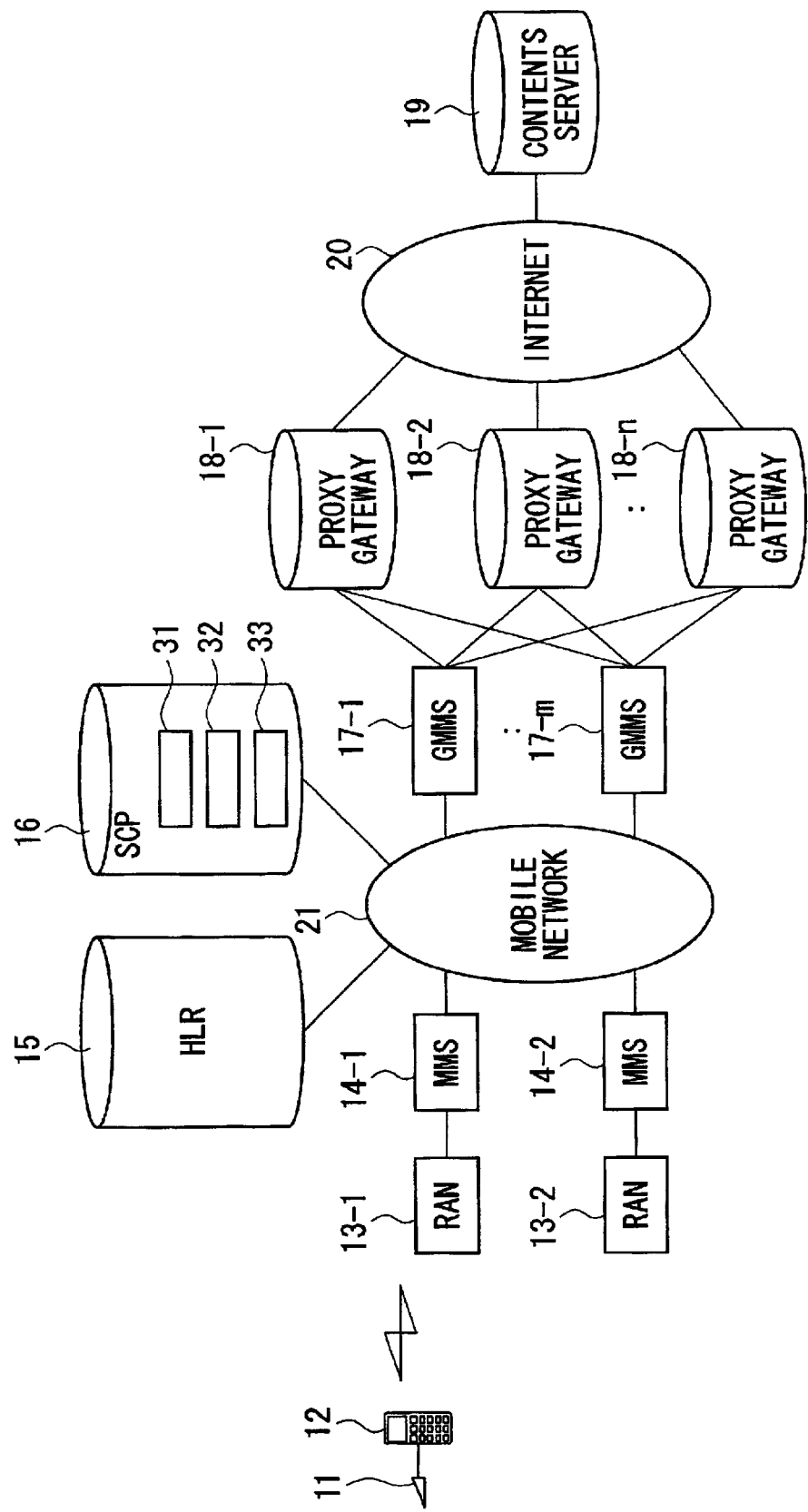
FIG. 1A is a block diagram showing the structure of an embodiment of the mobile communication system according to the present invention.

FIG. 1A is a diagram showing the structure of the mobile communication system of the present embodiment.

The mobile communication system comprises a client terminal 11, a mobile terminal 12, RANs (radio access networks) 13-1 and 13-2, mobile multimedia switching centers 14-1 and 14-2 (called "MMSs 14-1 and 14-2", hereinbelow), a home location register 15 (called "HLR 15", hereinbelow), a service control point 16 (called "SCP 16", hereinbelow), gateway mobile multimedia switching centers 17-1 to 17-m (called "GMMSs 17-1 to 17-m", hereinbelow), proxy gateways 18-1 to 18-n, and a contents server 19.

The client terminal 11 is a personal computer or mobile device which includes devices for obtaining data stored in the contents server 19 which is connected to the Internet 20 by using a mobile terminal 12, and for displaying the obtained data or audio-outputting the obtained data. Generally, the resources such as the display size, the memory capacity, and the like are restricted for making the client terminal 11 portable, and the client terminal 11 may be integrated with the mobile terminal 12.

The mobile terminal 12 has a communication device for accessing a mobile network 21 via the RAN 13-1 or 13-2, and the MMS 14-1 or 14-2, and for communicating with a desired communication partner, where the mobile network 21 is controlled by the SCP 16. If the communication partner is the contents server 19 on the Internet 20, the mobile terminal 12 accesses one of the GMMSs 17-1 to 17-m and one of the proxy gateways 18-1 to 18-n according to the control by the SCP 16, and obtains data stored in the contents server 19.

The RANs 13-1 and 13-2 are wireless-line control devices for performing the relay of the radio communication of the mobile terminal 12, and each RAN comprises a base station (BS) and a radio network controller (RNC). Each of the MMSs 14-1 and 14-2 connects the mobile terminal 12 to the mobile network 21, and performs the packet switching in the communication. The HLR 15 manages the subscriber data and location data of the mobile terminal 12.

The SCP 16 has a load data obtaining device 31 for obtaining load data of the proxy gateways 18-1 to 18-n, a load data storage device 32 for storing the obtained load data, and a gateway selecting device 33 for selecting a gateway, which is connected to the mobile terminal, based on the obtained load data.

The load data obtaining device 31 obtains the load data sent from the proxy gateways 18-1 to 18-n either periodically or when a measured load value exceeds a threshold, and the load data obtaining device 31 updates a load data management table provided in the load data storage device 32. Based on the load data management table, one of the proxy gateways 18-1 to 18-n which is connected to the mobile terminal 12 is selected (i.e., the session is established between the mobile terminal and the selected proxy gateway). The selected result is communicated to the mobile terminal 12.

If the load data sent from each of the proxy gateways 18-1 to 18-n indicates that the measured load value of the relevant gateway exceeds a predetermined threshold (that is, the load data is not a measured value but a result communicating such a situation), one of the proxy gateways 18-1 to 18-n, from which the load data has not been sent, is selected so as to distribute the load. On the other hand, if the load data sent from each of the proxy gateways 18-1 to 18-n indicates the measured load value, one of the proxy gateways 18-1 to 18-n which has the smallest load value is selected.

When one of the GMMS s 17-1 to 17-m receives the address of the proxy gateway selected by the SCP 16 among the proxy gateways 18-1 to 18-n, the GMMS performs a process of connecting the selected proxy gateway and the mobile terminal 12.

Figure 1B:
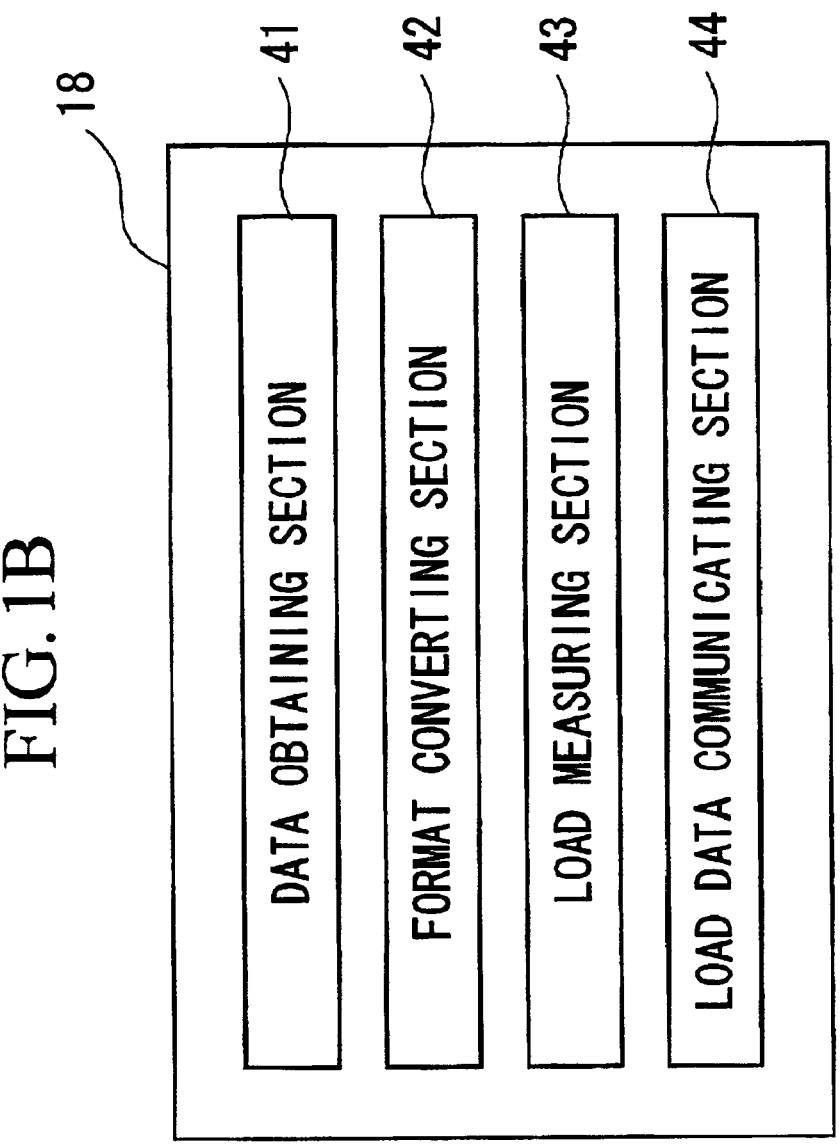
FIG. 1B is a diagram showing the internal structure of each proxy gateway.

As shown in FIG. 1B, each of the proxy gateways 18-1 to 18-n (i.e., each proxy gateway 18) comprises a data obtaining section 41 for obtaining contents from the contents server 19, a format converting section 42 for converting the format of the obtained data according to restrictions on the resources of the mobile terminal 12, a load measuring section 43 for measuring the load related to a predetermined process including the contents-obtaining process and the format conversion, and a load data communicating section 44 for communicating load data with respect to the measured load.

That is, in each of the proxy gateways 18-1 to 18-n, the data obtaining section 41 obtains contents stored in the target contents server 19 requested by the mobile terminal 12, and the format of the obtained contents is converted by the format converting section 42 so as to consider the resource restrictions of the mobile terminal 12, and the contents having the converted format are sent to the mobile terminal 12. The load measuring section 43 measures the load of the relevant proxy gateway imposed on the process including the session engagement and the format conversion. The measurement is performed based on, for example, the number of the sessions which are being engaged, or the activity or usage rate of the CPU in the relevant proxy gateway. The load data communicating section 44 generates a load data communicating signal based on the measured load value, and sends the signal to the SCP 16. If the measured load value (measured by the load measuring section 43) exceeds a threshold, the situation is communicated by the load data communicating section 44. Instead, the load data communicating section 44 may periodically or regularly communicate the measured value.

The contents server 19 is then connected to the Internet 20, and receives a contents request via the Internet 20 and sends specific contents according to the contents request.

Below, the operation of the mobile communication system having the above-explained structure and the gateway selecting method will be explained. FIG. 2 is a timing chart of the load data communicating process performed in the mobile communication system, as an embodiment of the present invention.

Each of the proxy gateways (i.e., proxy GWs) 18-1 to 18-n regularly measures its load. The parameter of the load measurement may be the activity or usage rate of the CPU, or the number of sessions which are being engaged. According to the measurement of the number of the engaged sessions, the number of the communication devices connected to the relevant proxy gateway can be obtained. Generally, the load increases according to an increase of the number of the connected communication devices. On the other hand, according to the measurement of the activity rate of the CPU, the load imposed on the whole proxy gateway can be measured.

If the result of the load measurement indicates that the measured value exceeds a predetermined threshold, then the relevant proxy gateway 18 sends a load data communicating signal to the SCP 16 via the GMMS 17.

When the SCP 16 receives a load data communicating signal from the proxy gateways 18-1 to 18-n, the SCP 16 updates the contents of its own load data management table. In the selection of the proxy gateway, the SCP 16 selects any one of the proxy gateways 18-1 to 18-n, from which the SCP has not received a load data communicating signal.

If the measured load value does not exceed the threshold, the proxy gateway need not send a load data communicating signal, but may always inform the SCP 16 of the measured load value so as to equally distribute the load of the gateways. In this case, in the selection of the proxy gateway, the SCP 16 selects one of the proxy gateways 18-1 to 18-n which has the smallest amount of load.

Figure 3:
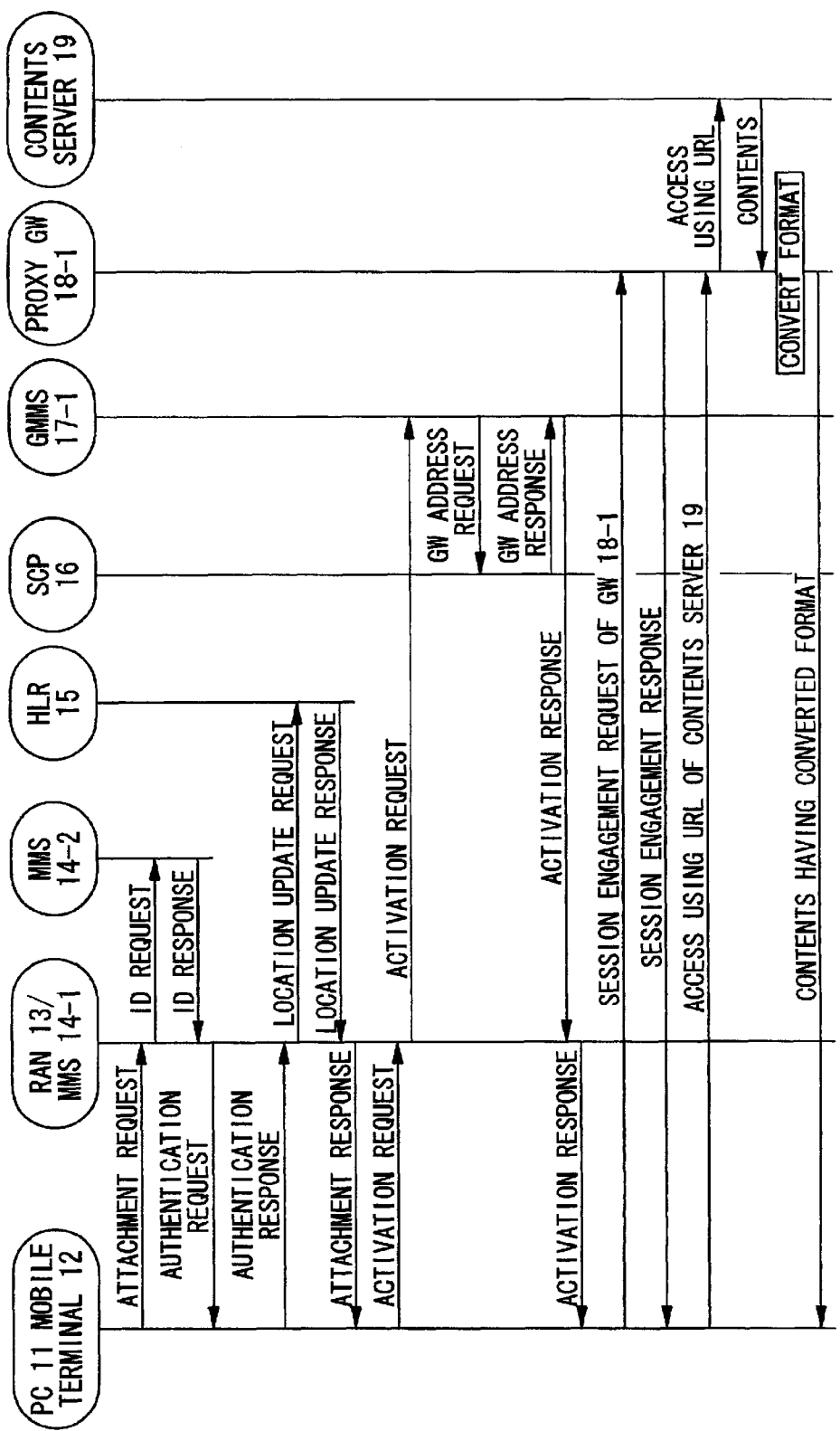
FIG. 3 is a timing chart of the packet communication registration process performed in the mobile communication system, as an embodiment of the present invention.

Below, a packet communication registration process using the gateway selecting method of the mobile communication system according to the present invention will be explained. FIG. 3 is a timing chart of an embodiment of the packet communication registration process.

When the power of the mobile terminal 12 is switched on, the mobile terminal 12 sends the mobile network 21 an attachment request (signal) which includes (i) a mobile terminal ID called "P-TMSI12 (i.e., packet temporary mobile station identifier 12)" which the MMS 14-2 temporarily assigned to the mobile terminal 12 when the mobile terminal 12 belonged to the management area of the MMS 14-2, (ii) a previous location-registration area code, and the like.

When the MMS 14-1 receives the attachment request from the mobile terminal 12 via the RAN 13-1, the MMS 14-1 specifies the MMS 14-2 (to which the mobile terminal 12 was previously associated, that is, the mobile terminal belonged to the area managed by the MMS 14-2) based on the ID "P-TMSI12" and the previous location-registration area code of the mobile terminal 12, and requests the MMS 14-2 to send an ID.

When the MMS 14-2 receives the ID request from the MMS 14-1, the MMS 14-2 sends the MMS 14-1 an ID response signal which includes a mobile terminal ID and authentication data determined by referring to P-TMSI12 included in the ID request signal. The MMS 14-1 performs an authentication process based on the authentication data (relating to the mobile terminal 12) received from the MMS 14-2. After the MMS 14-1 confirms the mobile terminal as a legal client, the MMS 14-1 sends a location update request signal to the HLR 15 so as to inform the HLR 15 that the mobile terminal 12 currently belongs to (the management area of) the MMS 14-1.

When the HLR 15 receives the location update request signal from the MMS 14-1, the HLR 15 updates the location data of the mobile terminal 12, and sends the MMS 14-1 subscriber data of the mobile terminal 12 by using a location update response signal.

When the MMS 14-1 receives the location update response signal from the HLR 15, the MMS 14-1 stores the subscriber data of the mobile terminal 12 included in the received signal, and assigns a mobile terminal ID P-TMSI12' to the mobile terminal 12. The MMS 14-1 informs the mobile terminal 12 of the ID by sending an attachment response signal.

When the mobile terminal 12 receives the attachment response signal from the MMS 14-1 via the RAN 14-1, the mobile terminal 12 then sends the GMMS 17-1 (via the MMS 14-1) an activation request signal for registering the personal computer (PC) 11 in the mobile network 21.

When the GMMS 17-1 receives the activation request signal from the mobile terminal 12 via the MMS 14-1, the GMMS 17-1 sends a GW (gateway) address request signal to the SCP 16.

When the SCP 16 receives the GW address request signal, the SCP 16 refers to its own load data management table, and selects, for example, the proxy gateway 18-1, and informs the GMMS 17-1 of the selected result by sending a GW address response signal to the GMMS 17-1.

When the GMMS 17-1 receives the GW address response signal from the SCP 16, the GMMS 17-1 performs a process of registering the personal computer 11 and the mobile terminal 12, and sends the personal computer 11 and the mobile terminal 12 an activation response signal in which the GMMS 17-1 stores the GW address (i.e., the address of the relevant gateway) previously received from the SCP 16.

When the personal computer 11 and the mobile terminal 12 receive the activation response signal, the personal computer 11 and the mobile terminal 12 store the address of the selected gateway to be connected (here, the proxy gateway 18-1) included in the received signal.

The packet communication registration process according to the present invention is then completed.

If the personal computer 11 functioning as a client terminal receives contents from the contents server 19, the personal computer 11 sends a contents request to the contents server 19 after a session is established between the personal computer 11 and the proxy gateway 18-1.

When the proxy gateway 18-1 receives contents from the contents server 19, the proxy gateway 18-1 converts the format of the contents into a suitable format, and then sends the contents to the mobile terminal 12 and the personal computer 11.

The above processes or functions can be realized by a computer. In that case, each step of the processes which should be performed in the mobile communication system is described in a program which is stored in a computer readable storage medium. Therefore, the processes can be performed by the computer, that is, by executing the program on the computer. A magnetic storage device, semiconductor memory, or the like, may be used as such a computer readable storage medium.

What is claimed is:

1. A mobile communication system for providing a service of connecting a mobile terminal to a predetermined communication network, comprising:
  a plurality of gateways, each including:
    a data obtaining section for obtaining data stored in a predetermined information server connected to the communication network in response to a request from the mobile terminal;
    a format converting section for converting the format of the obtained data according to restrictions on resources of the mobile terminal;
    a load measuring section for measuring load imposed on predetermined processes including the data obtainment and the format conversion; and
    a load data communicating section for communicating load data indicating information relating to the measured load, and
  a mobile communication control apparatus including:
    a load data obtaining device for obtaining the load data communicated from each gateway;
    a load data storage device for storing the obtained load data; and
    a gateway selecting device for selecting one of the gateways, which is connected to the mobile terminal, based on the obtained load data when the mobile communication control apparatus receives a request for obtaining the data stored in the information server from the mobile terminal,
  wherein:
    the load data communicating section of each gateway communicates the load data to the mobile communication control apparatus when the load measured by the load measuring section exceeds a predetermined threshold; and
    the gateway selecting device of the mobile communication control apparatus selects one of the gateways which has not communicated the load data.

2. A mobile communication system as claimed in claim 1, wherein:
  the predetermined communication network is the Internet; and
  the data obtaining section of each gateway obtains contents in a Web site on the Internet.

3. A mobile communication system as claimed in claim 1, wherein the load measuring section of each gateway measures the number of sessions of the gateway which are being engaged.

4. A mobile communication system as claimed in claim 1, wherein the load measuring section of each gateway measures an activity rate of a processor for controlling all relevant processes including the data obtainment and the format conversion.

5. A mobile communication system for providing a service of connecting a mobile terminal to a predetermined communication network, comprising:
  a plurality of gateways, each including:
    a data obtaining section for obtaining data stored in a predetermined information server connected to the communication network in response to a request from the mobile terminal;
    a format converting section for converting the format of the obtained data according to restrictions on resources of the mobile terminal;

a load measuring section for measuring load inposed on predetermined processes including the data obtainment and the format conversion; and a load data communicating section for communicating load data indicating information relating to the measured load, and a mobile communication control apparatus including:

a load data obtaining device for obtaining the load data communicated from each gateway;

a load data storage device for storing the obtained load data; and a gateway selecting device for selecting one of the gateways, which is connected to the mobile terminal, based on the obtained load data when the mobile communication control apparatus receives a request for obtaining the data stored in the information server from the mobile terminal, wherein:

the load data communicating section of each gateway communicates, at periodic intervals, a load value measured by the load measuring section to the mobile communication control apparatus; and the gateway selecting device of the mobile communication control apparatus refers to the measured load value of each gateway and selects one of the gateways which has the smallest value.

6. A gateway selecting method of selecting one of gateways in a mobile communication system for providing a service of connecting a mobile terminal to a predetermined communication network, the method comprising:

the steps performed by each of the gateways, including:

a data obtaining step for obtaining data stored in a predetermined information server connected to the communication network in response to a request from the mobile terminal;

a format converting step for converting the format of the obtained data according to restrictions on resources of the mobile terminal;

a load measuring step for measuring load imposed on predetermined porcesses including the data obtainment and the format conversion; and a load data communicating step for communicating load data indicating information relating to the measured load, and the steps performed by a mobile communication control apparatus for selecting one of the gateways, wherein a session is engaged between the selected gateway and the mobile terminal, said steps including:

a load data obtaining step for obtaining the load data communicated from each gateway;

a load data storage step for storing the obtained load data; and a gateway selecting step for selecting one of the gateways, which is connected to the mobile terminal, based on the obtained load data when a request for obtaining the data stored in the information server is sent from the mobile terminal to the mobile communication control apparatus, wherein:

the load data communicating step includes communicating the load data to the mobile communication control apparatus when the load measured by the load measuring section exceeds a predetermined threshold; and the gateway selecting step includes selecting one of the gateways which has not communicated the load data.

7. A gateway selecting method as claimed in claim 6, wherein the load measuring step includes measuring the number of sessions of the gateway which are being engaged.

8. A gateway selecting method as claimed in claim 6, wherein the load measuring step includes measuring an activity rate of a processor for controlling all relevant processes including the data obtainment and the format conversion.

9. A gateway selecting method as claimed in claim 6, wherein:

the load data communicating step includes communicating a load value measured by the load measuring section to the mobile communication control apparatus; and the gateway selecting step includes referring to the measured load value of each gateway and selecting one of the gateways which has the smallest value.

* * * * *